June 27, 1939.  K. NEKOLNY  2,164,161
DEVICE FOR THE INDICATION OF RADIO TRANSMISSIONS
Filed April 1, 1938
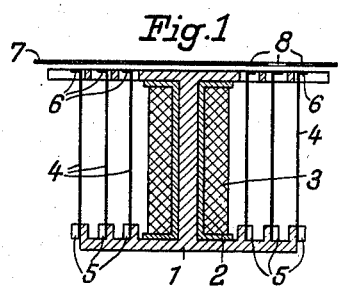
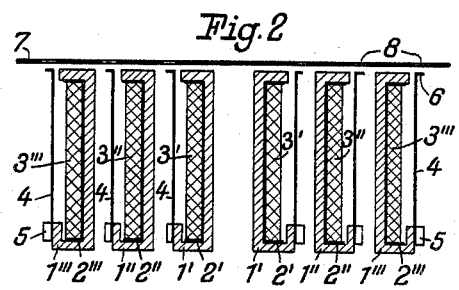
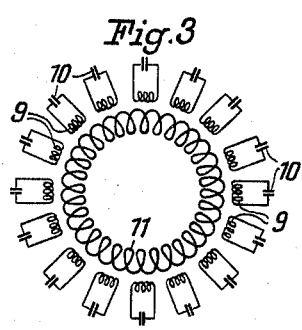
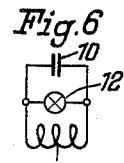
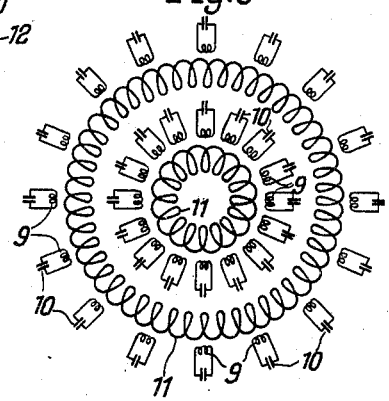
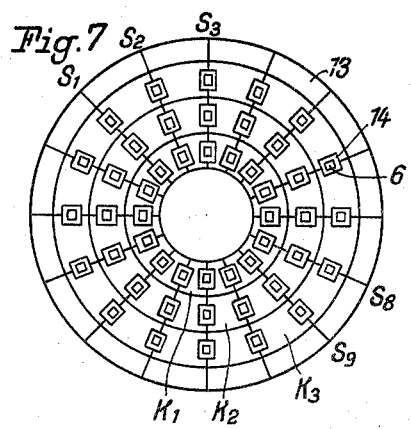
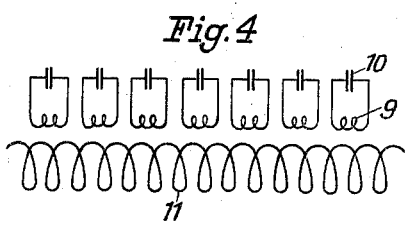
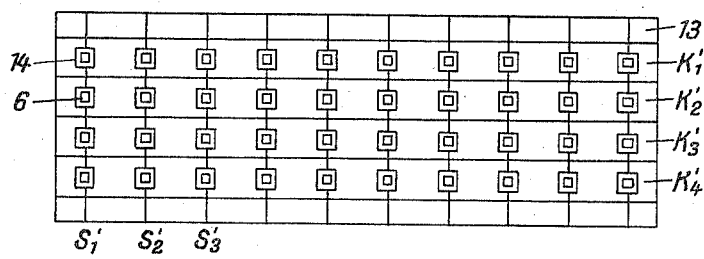
Inventor:
Kurt NEKOLNY
BY *Heinrich Hochschild*
ATTORNEY Patented June 27, 1939

2,164,161

UNITED STATES PATENT OFFICE 2,164,161

DEVICE FOR THE INDICATION OF RADIO TRANSMISSIONS

Kurt Nekolny, Budapest, Hungary, assignor of two-thirds to Mor Lajta, Budapest, Hungary Application April 1, 1938, Serial No. 199,538
In Hungary February 19, 1938

6 Claims. (Cl. 250—6)

For determining the nature of broadcast programs up to now two means are available. Either a large number of stations is to be tuned in and listened to, for the purpose of selecting from the large number of available programs and stations the program desired, or it is necessary to examine a previously printed program which in the meanwhile may have been changed. Both ways are inconvenient and take up much time.

The object of this invention is a device which assembles certain identification signals emitted from a variety of operating stations so as to characterize each station as well as the nature of its program. The assemblage of these identification signals makes it possible to select from the variety of available programs the program desired.

A further object of the invention is to assemble these signals in such a way that their recognition and interpretation is based on a certain code, which if desired may be secret.

A further object of the device according to this invention is to allow the discerning of operating broadcast stations together with the nature of their various programs by means of modulations, superposed on electromagnetic carrier waves. These modulations are allotted to the various stations and to the various types of their programs and are accompanying the broadcasting of the programs.

The device includes mechanical, or electrical, or other oscillatory elements of a number corresponding to the number of selected stations and to the number of selected types of programs which each station sends and which are of interest.

Each of these oscillatory elements is tuned to the modulation characteristic of one certain station and of one of the types of programs sent by the station. The device further includes means for energizing these oscillatory elements, and means for visually indicating the condition of the oscillatory elements relating their state of oscillation or rest.

If mechanically oscillating elements are used, they may be ferromagnetic elastic metal tongues, each of which is tuned to a definite mechanical frequency. If the oscillation elements are electrical oscillatory circuits each of them is tuned to a definite electromagnetic frequency.

The means energizing the mechanically oscillating elements may either consist of a single magnetic system common to all the elements or of a number of magnetic systems corresponding to the number of oscillatory elements or to the number of groups of such elements, whereas the means energizing the electromagnetically oscillating elements may either consist of a single inductance coil common to all the oscillatory elements, or of a number of inductances corresponding to the number of oscillatory elements or to the number of groups of such elements. The energizing resonance circuits may be coupled with the inductance or inductances in any convenient way, galvanically, inductively, or capacitively.

The means for visually indicating the condition of oscillation of the various oscillatory elements may be signals of any kind, e. g., self-luminiscent signals, apparatus sensitive or responsive to voltage, e. g., luminous tubes, movable coils, magnetic needles, or the like.

The individual indicators may be arranged in groups each of which may be allotted to a program of a certain type, whilst the individual units of each group may be allotted to a certain broadcasting station. A coordinate system or relationship of indicators is thus set up, the indicators corresponding to the one kind of coordinates representing the various stations, the indicators corresponding to the other kind of coordinates representing the various types of station programs.

The indicators may thus be arranged on a set of concentric circles and a set of radii, or in a system of rows and columns. In the first arrangement each circle may correspond to a definite type of program and each radius to a certain station. In the second arrangement rows may correspond to programs and columns to stations.

The device may further comprise a covering board, disc or plate, in which there may be provided openings or other means for rendering visible the indicating means and from which board the allocation of each indicator or oscillatory element as to station and type of station program may be read.

The various indicators may be arranged on the station scale, usually provided at the receiving sets, in the form of a chart, or table, in circles or in any other schedule.

A number of embodiments of the device according to this invention is illustrated diagrammatically and by way of example on the accompanying drawing, in which:

Fig. 1 shows a longitudinal section of an embodiment in which the energizing magnetic system is common to all oscillatory elements;

Fig. 2 shows a longitudinal section of an embodiment in which each group of oscillatory elements is provided with an individual energizing magnetic system;

Fig. 3 shows a diagrammatic view of an embodiment in which an energizing inductance coil is common to all of the electrical oscillatory circuits;

Fig. 4 illustrates another embodiment diagrammatically, similar to that of Fig. 3, in which, however, the inductance coil and the oscillatory circuits are arranged longitudinally;

Fig. 5 shows a diagrammatic view of an embodiment in which each group of the electric oscillatory circuits is provided with its individual energizing inductance coil;

Fig. 6 illustrates diagrammatically an electrical oscillatory circuit to which a means indicating the condition of resonance is connected;

Fig. 7 is a plan view of a covering board of circular shape; whereas

Fig. 8 shows the plan view of a covering board of rectangular shape.

In Fig. 1, an energizing magnet consists of the frame 1, the coil box 2, the coil 3; the ferro-metallic tongues 4 are the oscillatory elements, which are held by the supports 5. Indicators 6 are provided at the top ends of the tongues and may be observed through openings 8 of the covering plate 7. The energizing magnetic system 1, 2, 3, is common to all the tongues 4.

In the embodiment illustrated in Fig. 2, three concentrically arranged groups of tongues are provided. Each group of metal tongues has its individual energizing magnetic system 1', 2', 3'; 1'', 2'', 3''; 1''', 2''', 3''', respectively. As is illustrated in Figs. 1 and 2, the ferro-metallic tongues are arranged so as to close the magnetic circuit or the magnetic circuits between the lower and the top ends of the magnet frames.

In the embodiments shown in Figs. 3, 4, and 5, the electromagnetic oscillation circuits are composed of the inductance coils 9 and the condensers 10 and are energized by the inductance coil or inductance coils 11, respectively. In the embodiments illustrated in Figs. 3 and 4, the energizing inductance coils are common to all oscillatory circuits, whereas in the embodiment shown in Fig. 5 both groups of electromagnetic oscillatory circuits are provided with an energizing inductance coil each.

By suitably selecting and adjusting inductance or capacity or both of the various oscillatory circuits, these circuits are tuned to the various characteristic modulations.

In the arrangement shown in Fig. 6, there is inserted into the electrical oscillatory circuit a luminous tube 12 which will indicate the condition of oscillation.

Fig. 7 shows a covering board 13 of circular shape provided with openings 14 exposing the indicators 6. On the board, the openings on the radii $S_1$, $S_2$, $S_3$, . . . represent the transmitting station whereas the openings on the rings $K_1$, $K_2$, $K_3$, . . . represent the kind or nature of the station programs.

Fig. 8 illustrates a covering board 13 of rectangular shape. The openings on the columns $S'_1$, $S'_2$, $S'_3$, . . . are allotted to the broadcast stations, whereas the nature of their various programs may be read from the openings in the rows or strips $K'_1$, $K'_2$, $K'_3$, . . . ..

The device according to this invention may be operated in the following manner:

Upon a carrier wave certain modulations are superposed characterizing the stations, participating in, or organizing the service of program distribution, and the nature or type of the program which they are sending at that moment. Suppose, for instance, that 15 stations are participating in the program distribution service and that it be desired to give ten different indications for ten various types of program, e. g., news, political talks, economical talks, orchestra music, chamber music, dance music, sports, scientific or literary talks, religious service, etc. It will then be necessary to select 150 different characteristic modulations, e. g., in the form of sinoidal oscillations of low frequency, preferably in the inaudible band. To each of the fifteen stations a definite band of modulation wave lengths to be superposed on the carrier wave, is allotted. Each band is taken large enough to permit sending ten distinguishable modulations corresponding to the ten different types of program.

The receiving set transmits the various characteristic modulations from the carrier wave to the corresponding selectively tuned indicators, of the program receiving and communicating set.

The indicators will thus, at any time, give information at the receiving station of the nature of the programs sent by the various transmitting stations.

If, for instance, a listener wishes to hear dance music, he will examine on the indication board 13 ring $K_1$, or strip $K'_1$, respectively, which indicate dance music and find out which indicator 6 is oscillating. This indicator will then indicate on the radius $S_1$, $S_2$, . . . or the column $S'_1$, $S'_2$, . . . on whichever it lies, which stations are sending dance music.

The characteristic modulation may be a simple or a composite sinoidal oscillation; in this case of composite oscillation, the mechanically oscillating elements are composed of a plurality of parts so as to be responsive to composite modulations.

The device according to the invention may also be constructed so that not all of the oscillatory elements are simultaneously operative, but that the free oscillation of part of these elements is prohibited, by mechanically fastening them, or by disconnecting them electrically, so that only certain particular types of programs, selected at will, will be indicated.

What I claim is:

1. A device for discerning operating broadcast stations together with the types of their various programs by means of modulations of electric carrier waves alotted to said broadcast stations and to the various types of their programs, and accompanying the broadcasting of said programs, said device including oscillatory elements, means for tuning each of said elements to one of said modulations, means responsive to said modulations and for energizing said oscillatory elements and means for visually indicating the oscillation condition of said elements.

2. A device for discerning operating broadcast stations together with the types of their various programs by means of modulations of electric carrier waves alotted to said broadcast stations and to the various types of their programs, and accompanying the broadcasting of said programs, said device including oscillatory elements, means for tuning each of said elements to one of said modulations, means individually responsive to said modulations and for energizing said oscillatory elements, indicators for visually indicating the oscillation condition of said oscillatory elements, said oscillatory elements and indicators set up in groups of coordinate relationship, the one kind of coordinates representing the various stations, the other kind of coordinates representing the nature of the various programs.

3. A device for discerning operating broadcast stations together with the types of their various programs by means of modulations of electric carrier waves allotted to said broadcast stations and to the various types of their programs and accompanying the broadcasting of said programs, said device including ferro-magnetic metal tongues capable of mechanical oscillation, each tongue tuned to one of said modulations, indicators for visually indicating the oscillation condition of said tongues, said tongues and said indicators set up in groups of coordinate relationship, the tongues and indicators corresponding to the one kind of coordinates indicating modulations allotted to various stations, and the tongues and indicators corresponding to the other kind of coordinates indicating modulations allotted to the nature of the various station programs, magnetic systems adapted to respond to said modulations and to energize said tongues, said magnetic systems common to the groups of tongues set up to the one kind of coordinates.

4. A device for discerning operating broadcast stations together with the types of their various programs by means of modulations of electric carrier waves allotted to said broadcast stations and to the various types of their programs and accompanying the broadcasting of said programs, said device including oscillatory elements, means for tuning each of said elements to one of said modulations, means individually responsive to said modulations and for energizing said oscillatory elements, indicators for visually indicating the oscillation condition of said oscillatory elements, said oscillatory elements and said indicators set up in coordinate systems of concentric circles and radii, the one kind of coordinates representing the various stations, the other kind of coordinates representing the nature of the various programs.

5. A device for discerning operating broadcast stations together with the types of their various programs by means of modulations of electric carrier waves allotted to said broadcast stations and to the various types of their programs and accompanying the broadcasting of said programs, said device including oscillatory elements, means for tuning each of said oscillatory elements to one of said modulations, means individually responsive to said modulations and for energizing said oscillatory elements, means for visually signalling the oscillation condition of said oscillatory elements, said oscillatory elements and signalling means arranged in groups of coordinate relationship, the one kind of coordinates representing the various stations, the other kind of coordinates representing the nature of the various programs, an indicating board for rendering visible the conditions of said oscillatory elements, and means for indicating on said board the allocation of each oscillatory element with regard to station and nature of program.

6. A device for discerning operating broadcast stations together with the types of their various programs by means of modulations of electric carrier waves allotted to said broadcast stations and to the various types of their programs and accompanying the broadcasting of said programs, said device including mechanically oscillating elements, means for tuning each of said elements to one of said modulations, means responsive to said modulations and for energizing said oscillatory elements and means for visually indicating the oscillation condition of said oscillatory elements, said oscillatory elements including units composed of a plurality of parts adapted to composite mechanical oscillation responsive to composite modulations transmitted.

KURT NEKOLNY.